United States Patent [19]

Hughes et al.

[11] Patent Number: 5,212,614
[45] Date of Patent: May 18, 1993

[54] FLEXIBLE MAGNETIC DISC CASSETTES WITH SEPARABLE CASSETTE CASES

[75] Inventors: Patrick M. Hughes, Clinton, N.J.; Maribeth Fletcher; Thaddeus R. Dudzik, both of Lisle, Ill.

[73] Assignee: Hoechst Celanese Corporation, Somerville, N.J.

[21] Appl. No.: 650,867

[22] Filed: Feb. 5, 1991

[51] Int. Cl.$^5$ ............................................. G11B 23/03
[52] U.S. Cl. ............................................. 360/133
[58] Field of Search ........................... 360/132–133; 242/199

[56] References Cited

U.S. PATENT DOCUMENTS

| | | | |
|---|---|---|---|
| Re. 32,781 | 11/1988 | Takahashi | 360/133 |
| 3,845,502 | 10/1974 | Paus | 360/86 |
| 4,078,246 | 3/1978 | Berthoux et al. | 360/133 |
| 4,436,201 | 3/1984 | Inaba | 206/444 |
| 4,445,155 | 4/1984 | Takahashi | 360/99 |
| 4,481,552 | 11/1984 | Dona et al. | 360/97 |
| 4,517,617 | 5/1985 | Tsuji et al. | 360/133 |
| 4,590,532 | 5/1986 | Saito | 360/133 |
| 4,613,044 | 9/1986 | Saito et al. | 206/444 |
| 4,628,388 | 12/1986 | Kawabe | 360/128 |
| 4,630,156 | 12/1986 | Saito | 360/133 |
| 4,652,961 | 3/1987 | Dieffenbach | 360/133 |
| 4,669,078 | 5/1987 | Ogusu | 369/291 |
| 4,686,666 | 8/1987 | Dieffenbach | 369/290 |
| 4,698,714 | 10/1987 | Sugawara et al. | 360/133 |
| 4,710,913 | 12/1987 | Matsushima et al. | 369/280 |
| 4,796,140 | 1/1989 | Wakabayashi et al. | 360/133 |
| 4,885,653 | 12/1989 | Kato | 360/133 |
| 4,903,224 | 2/1990 | Namiki et al. | 369/290 |
| 4,926,410 | 5/1990 | Suzki et al. | 369/290 |
| 4,941,066 | 7/1990 | Swinburne et al. | 360/133 |
| 4,944,982 | 7/1990 | Kikuchi | 428/64 |
| 4,945,530 | 7/1990 | Sandell et al. | 369/291 |

*Primary Examiner*—A. J. Heinz
*Attorney, Agent, or Firm*—Nixon & Vanderhye

[57] ABSTRACT

Relatively thin microdisc cassette cases having a generally rectangular parallelpiped shape and adapted to house therewithin a standardized 3.5-inch flexible magnetic disc, include a pair of opposing planar cassette case halves, and detent members for joining these cassette case halves one to another in face-to-face relationship. The detent members include a number of registered male and female detents which are sized and configured so as to be in an interference friction fit with one another. In such a manner, the cassette case halves are securely joined one to another without necessarily employing conventional ultrasonic welding techniques. However, the cassette case halves may nonetheless be separated upon application of a separatory force of sufficient magnitude. Preferably, the cassette case halves, and hence the male and female detent members, are unitarily molded from a polyacetal resin.

19 Claims, 3 Drawing Sheets

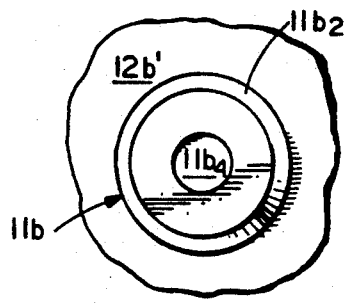
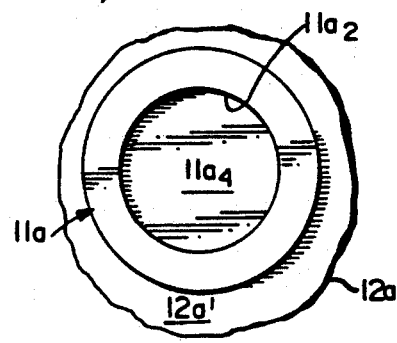
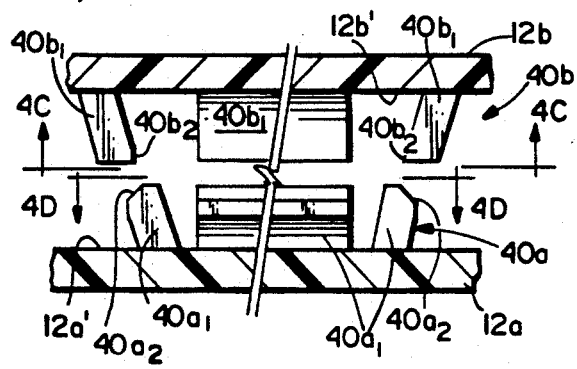
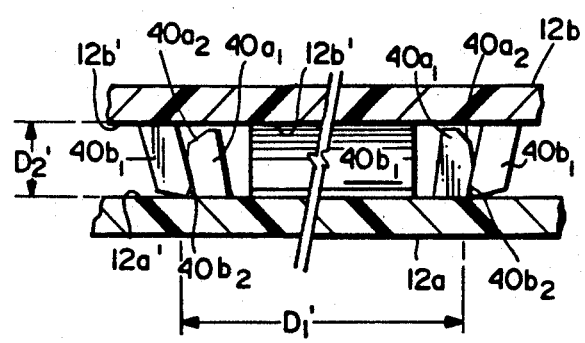
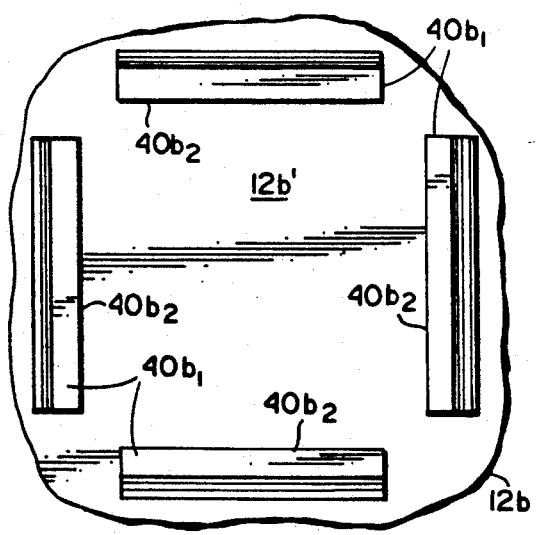
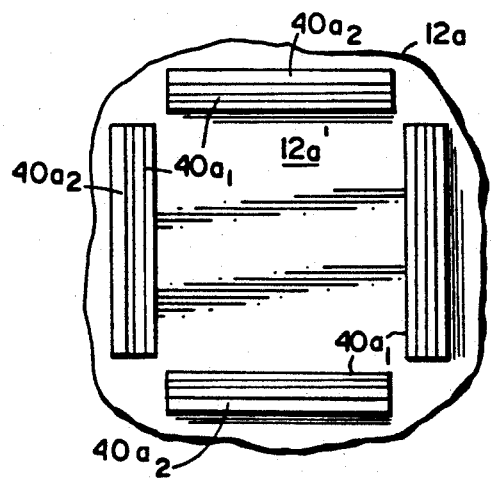

5,212,614

FLEXIBLE MAGNETIC DISC CASSETTES WITH SEPARABLE CASSETTE CASES

FIELD OF INVENTION

The present invention relates generally to cassettes for flexible sheet-like discs of magnetic media. More specifically, the present invention relates to improved cassette constructions for flexible magnetic discs whereby the cassette case is provided with frictionally interlocking, but separable, detents which serve to couple the cassette halves one to another and thereby enclose the flexible magnetic media therewithin. The interlocked detents may, however, be uncoupled with the application of sufficient separatory force so as to allow the flexible magnetic disc to be accessed (e.g., so as to allow replacement of damaged magnetic disc during cassette fabrication).

BACKGROUND AND SUMMARY OF THE INVENTION

Flexible sheet-like magnetic discs having a nominal standardized size of about 3.5-inches are widely used in a variety of data storage/retrieval systems. For example, cassettes which include flexible magnetic discs are used in conjunction with personal computers so as to load data and/or programs into the central processing unit of the computer, as well as to store data in an off-site location in a more convenient manner.

When placed into service in a magnetic recording/reproducing apparatus, the magnetic disc (which is accommodated for rotational movement within the interior of the cassette case) is caused to spin relative to a magnetic read/write head by means of a motor-driven spindle coacting with an aperture in the central hub of the magnetic disc. The spindle, moreover, serves to center the magnetic disc relative to the magnetic read/write head so that accurate placement and retrieval of data onto and from the disc will ensue.

The cassette case for flexible magnetic discs having a standardized size of about 3.5-inches (i.e., so-called "microdiscs") is relatively thin (i.e., on the order of about 0.14 inch (3.4 mm)). In this regard, it has been the industry practice for some time to physically join the cassette case halves (which are typically made of an ABS (acrylonitrile-butadiene-styrene) resin) using ultrasonic welding techniques. Although mateable male/female projections have been formed on the interior of conventional cassette case halves in order to provide "locators" they do not serve to physically couple the cassette halves one to the other. Instead, the cassette case halves are typically joined to one another by ultrasonic welding. (See in this regard, U.S. Pat. No. 4,517,617 to Tsuji et al, incorporated by reference herein).

Several problems, however, are associated with the ultrasonic welding of the cassette case halves. For example, ultrasonic welding of the cassette case halves requires vibration at ultrasonic frequencies to be imparted to the cassette case at localized regions so as to generate the necessary frictional abrasion to provide for localized temperature increases sufficient to at least partially melt the cassette case in the localized regions, so that upon resolidification, the cassette case halves are irreversibly joined to one another. The frictional abrasion necessary to achieve localized temperature increases, however, typically generates a sufficient amount of dust-like particles which remain contained within the cassette case. As one means of solving this problem, conventional microdisc cassettes have also included non-woven fabric protector and an associated lifter (which serves to bias the fabric protector into physical engagement with the flexible magnetic disc) so as to prevent the dust generated from the ultrasonic welding operation from disrupting the proper reading/writing of information from/onto the flexible magnetic disc.

During fabrication of conventional microdisc cassettes, a final quality check is performed on the magnetic media prior to shipment of the microdisc to the purchaser. Oftentimes, however, the flexible magnetic media does not satisfy quality standards (e.g., due to defects that may have occurred during handling as part of the fabrication process) and therefore must be segregated from the acceptable disc products. Because the cassette case halves have been irreversibly joined to one another via ultrasonic welding, the defective flexible magnetic disc cannot simply be replaced with a disc of acceptable quality. As a result, the entire assembled microdisc cassette must be scrapped—a costly necessity due to the labor investment that is involved in the fabrication process.

It would be especially desirable if means were provided to allow the cassette case halves of microdiscs to be joined one to another without ultrasonic welding. Such an improvement could possibly eliminate the need for fabric protectors which are provided with conventional microdisc cassettes, and thereby save the labor/handling costs associated with the same. In addition, the cassette case could be fabricated more easily with the cassette case halves being readily separable to allow defective magnetic media to be replaces. As a result, the entire microdisc cassette would not need to be scrapped. It is towards achieving such improvements to microdisc cassettes that the present invention is directed.

According to the present invention, novel microdisc (i.e., standardized 3.5-inch magnetic "floppy" discs) cassette cases formed of a molded thermoplastic material are provided whereby the opposing halves are joined to one another in face-to-face relationship without necessarily employing ultrasonic welding techniques. More specifically, the present invention includes joining the opposing cassette case halves one to another by means of frictionally interengaged male and female detent members which are formed as one-piece structures with respective ones of the cassette case halves. Preferably, the frictional interengagement between the male and female detent members provide the sole means by which the cassette case halves are joined.

The male and female detent members each have a peripheral edge which defines a generally annular interengagement region. That is, the peripheral edges of the male and female detent members will each frictionally engage one another within the generally annular region circumscribed by each. This annular region of frictional interengagement between the male and female detent members is beneficial as it maximizes the amount of interference fit therebetween, while minimizing the detent members' depth dimension (i.e., as measured perpendicular to the plane of the cassette case halves). In this regard, the width dimension of the generally annular interengagement region (i.e., as measured in a plane parallel to the plane of the cassette case halves) is at least about two times, and most preferably at least about three times, the interengagement region's depth dimension.

According to some embodiments of this invention, the male detent members are in the form of a projecting nib having an enlarged cylindrical head portion. The female detent member, on the other hand, will be in the form of a conforming annular upright wall which defines a space that is sized and configured to accept the enlarged cylindrical head of the male nib therewithin. The annular upright wall will moreover preferably define an entranceway of reduced dimension so as to enhance the interference fit between the enlarged head of the male nib and the space defined by the upright annular wall.

Another embodiment of this invention includes a number of discrete walls arranged so as to circumscribe generally the annular interengagement region. In its preferred form, the discrete walls of the male detents will each project outwardly from their associated cassette case half in converging relationship to one another. The discrete walls of the female detents, however, will each project outwardly from their respective cassette case half but in a diverging relationship to one another. The walls of the male detents will thus be in interference fit on an exterior lateral side of the walls of the female detents within the annular interengagement region defined thereby.

Further aspects and advantages of this invention will become more clear after careful consideration is given to the detailed description of the preferred exemplary embodiments thereof which follow.

BRIEF DESCRIPTION OF THE ACCOMPANYING DRAWINGS

Reference will hereinafter be made to the accompanying drawings wherein like reference numerals throughout the various FIGURES denote like structural elements, and wherein;

FIGS. 3C and 3D are each plan views of the male and female detents, respectively, shown in the embodiment of FIGS. 3A and 3B;

FIGS. 4A and 4B show in cross-sectional elevation, another embodiment of the cassette case detents according to the present invention in uncoupled and coupled states, respectively; and FIGS. 4C and 4D are each plan views of the male and female detents, respectively, shown in the embodiment of FIGS. 4A and 4B.

DETAILED DESCRIPTION OF THE PREFERRED EXEMPLARY EMBODIMENTS

Figure 1:
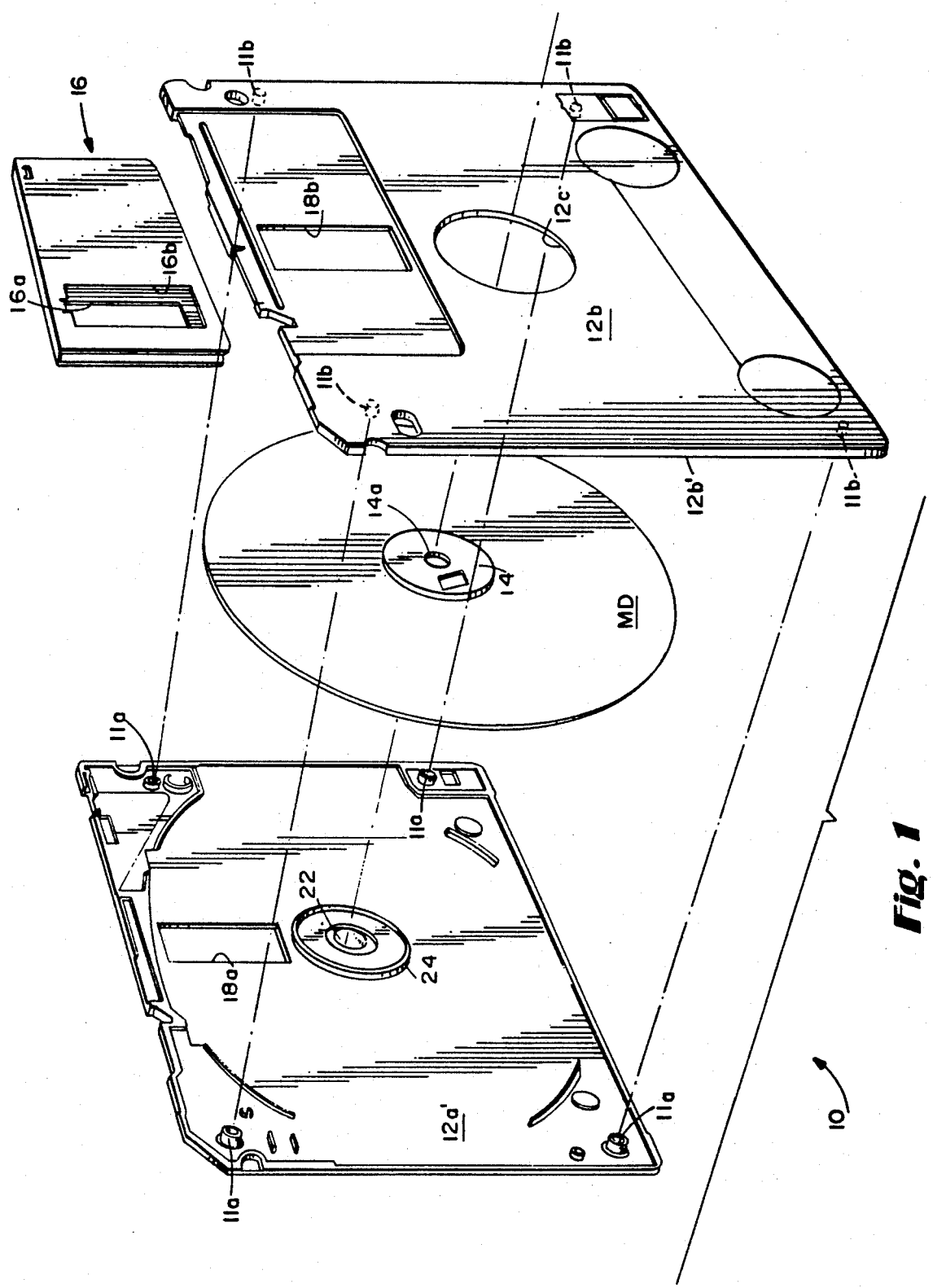
FIG. 1 is a perspective view of a flexible magnetic disc cassette according to the present invention.

Accompanying FIG. 1 shows a preferred embodiment of a flexible magnetic disc cassette 10 according to the present invention. The cassette 10 shown in FIG. 1 is, moreover, configured according to accepted industry standards for nominal 3.5-inch discs. In this regard, the cassette 10 includes a molded cassette case formed of a thermoplastic material and having upper and lower cassette case halves 12a, 12b, respectively, joined to one another along in face-to-face relationship via registered interference fit female and male detent members 11a, 11b, respectively (only the female detent members 11a being visible in FIG. 1). The structural and functional attributes of these female and male detent members 11a, 11b, respectively, will be discussed in greater detail below.

The lower cassette case half 12b defines an enlarged opening 12c which accommodates a drive carriage (not shown) associated with a conventional magnetic recording/reproducing apparatus. The drive carriage will also include a centrally located spindle which coacts with the drive aperture 14a associated with the central hub 14 of the magnetic disc MD.

The cassette case 12 will also have a movable shutter 16 which is biased via a spring element (not shown) in a direction whereby the the shutter 16 is in a position which closes each of the access windows 18a and 18b defined in the upper and lower case halves 12a and 12b, respectively. The shutter 16 itself defines openings 16a, 16b, which may be brought into registry with the windows 18a, 18b, when the shutter 16 is moved into its opened position against the bias force of the spring element (not shown). Movement of the shutter 16 into its opened position typically happens automatically when the cassette 10 is inserted into the input slot of a magnetic recording/reproducing apparatus. The magnetic read/write head of such recording/reproducing apparatus may thus be brought into operative association with the magnetic disc MD by virtue of the registry of the openings 16a, 16b with the windows 18a, 18b, respectively.

The upper cassette case half 12a is most preferably provided with an integrally molded wear button 22 which projects outwardly from the interior surface of the case half 12a. The wear button 22 provides a low friction surface against which the terminal end of the motor-driven spindle associated with the magnetic recording/reproducing apparatus bears during operation. Preferably, the wear button 22 is a one-piece molded structure with the cassette case half 12a.

The interior surface of the upper cassette case half 12a is also preferably provided with a magnetic disc centering ring 24 integrally molded with, and protruding from, the interior surface of the upper cassette case half 12a in annular relationship to the wear button 22 as shown in accompanying FIG. 2. The centering ring 24 serves as a guide for the central hub 14 of the magnetic disc MD during use, and also prevents lateral slippage of the magnetic disc MD within the cassette case 12 (which could damage the same) during periods of non-use.

As noted briefly above, the present invention is particularly concerned with providing a microdisc cassette case with the means which enable the cassette case halves 12a, 12b to be press-fit one to another in face-to-face relationship. In this regard, the female and male detents 11a, 11b are provided with an interference fit therebetween such that they do not readily separate when coupled together, but may be separated without destroying the cassette case by means of a separatory force of sufficient magnitude. Thus, the embodiments of the female and male detents to be described in greater detail below will maintain their coupled relationship even when dropped from a height of approximately one (1) meter such that the cassette case strikes a rigid surface on edge at one of its corners.

One preferred embodiment of the female and male detent members $11a$, $11b$, respectively, is shown in accompanying FIGS. 2A–2D. As is seen, the male detent member $11b$ is molded as a one-piece structure (i.e., unitary) with the cassette case half $12b$ and protrudes outwardly from the inner surface $12b$ thereof. The female detent member $11a$, on the other hand, is in the form of an annular upright wall structure which protrudes outwardly from the interior surface $12a'$ of the cassette case half $12a$ in opposition to the male detent member $11b$.

The male detent member $11b$ terminates in an enlarged head portion $11b_1$ which is preferably of cylindrical geometry and is sized and configured to be accepted within the interior space $11a_1$ bounded, and thereby defined, by the upright wall structure forming the female detent member $11a$. The female detent member $11a$ most preferably includes an annular (i.e., protrudes radially inwardly) lip structure $11a_2$ which forms an entranceway for the enlarged head portion $11b_1$ of the male detent member $11b$ and thereby increases the interference fit between it and the female detent member $11a$.

The innermost rim of the lip structure $11a_2$ is formed into a bevelled surface $11a_3$ which conformingly mates with a proximal annular bevelled edge surface $11b_3$ of the enlarged head $11b_1$. The enlarged head $11b_1$ also defines a distal annular bevelled edge surface $11b_2$ which serves as a camming surface during the introduction of the enlarged head $11b_1$ of the male detent $11b$ into the space $11a_1$ bounded by the wall structure of the female detent member $11a$. That is, forcibly moving the enlarged head portion $11b_1$ through the smaller dimensioned entranceway defined by the lip structure $11a_2$ will cause the latter to radially expand somewhat so as to allow the enlarged head portion $11b_1$ to pass therethrough. Once the enlarged head $11b_1$ is clear of the dimensionally restricted entranceway, the lip structure will expand to its normal dimension due to the resiliency of the plastics material from which it is molded. Such a state is shown in FIG. 2B.

Figure 2A:
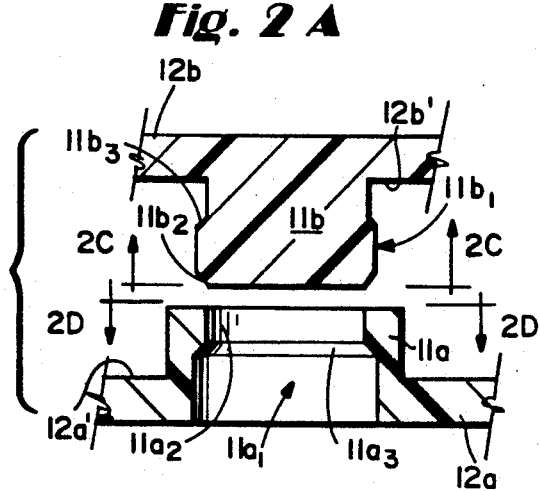
FIGS. 2A and 2B show in cross-sectional elevation, an embodiment of the cassette case detents according to the present invention in uncoupled and coupled states, respectively.
Figure 2B:
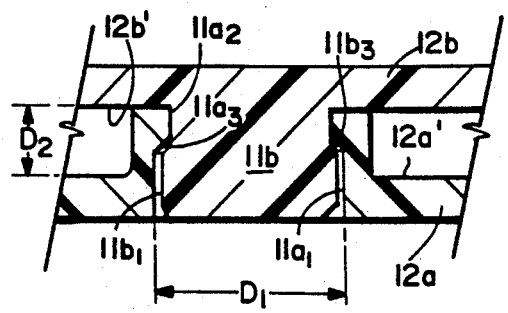
Figure 2C:
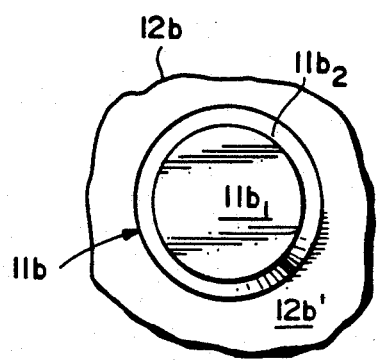
FIGS. 2C and 2D are each plan views of the male and female detents, respectively, shown in the embodiment of FIGS. 2A and 2B.
Figure 2D:
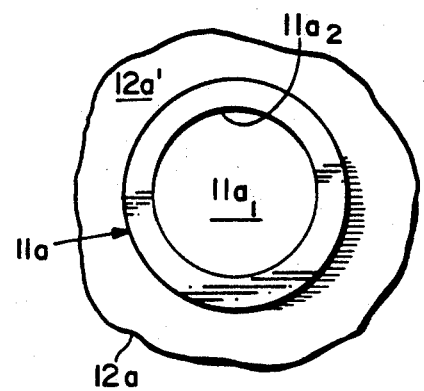

As is also shown in FIG. 2B, the interengagement region between the female and male detent members $11a$ and $11b$, respectively, have a width dimension $D_1$ (measured parallel to the cassette halves $12a$, $12b$) which is at least about two times (and most preferably at least about three times) the engagement regions's depth dimension $D_2$ (measured perpendicular to the plane of the cassette halves $12a$, $12b$ between the interior surfaces $12a'$, $12b'$).

Accompanying FIGS. 3A–3D show another preferred embodiment of the present invention that is similar in many respects to the embodiment shown in FIGS. 2A–2D described above. Similar structures shown in FIGS. 3A–3D have therefore retained the same reference numerals as used in FIGS. 2A–2D. In this regard, it will be noted that one principal difference is that the female detent member $11a_4$ is provided with a bottom wall $11a$ (rather than defining a through aperture as in the embodiment of FIGS. 2A–2D) which is actually the cassette case half $12a$ itself. Another principal difference in the embodiments shown in FIGS. 2A–2D and 3A–3D, respectively, is that the latter includes an axial open-ended recess $11b$.

Figure 3A:
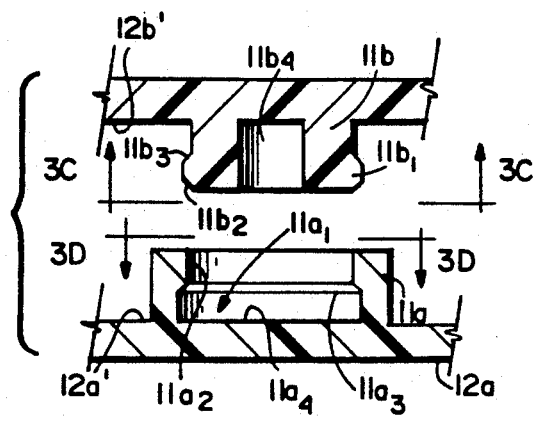
FIGS. 3A and 3B show in cross-sectional elevation, another embodiment of the cassette case detents according to the present invention in uncoupled and coupled states, respectively.
Figure 3B:
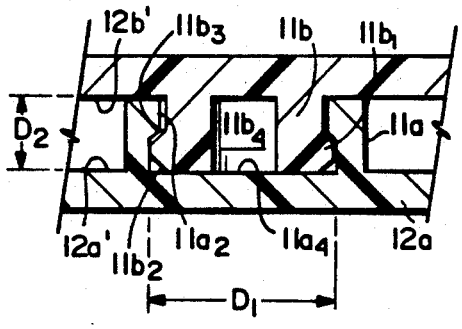

As is also shown in FIGS. 2B and 3B, however, each of the embodiments have an interengagement region between the female and male detent members $11a$ and $11b$, respectively, with a width dimension $D_1$ (measured parallel to the cassette halves $12a$, $12b$) which is at least about two times (and most preferably at least about three times) the engagement region's depth dimension $D_2$ (measured perpendicular to the plane of the cassette halves $12a$, $12b$ between the interior surfaces $12a'$, $12b'$).

Thus, the axial open-ended recess $11b_4$ will compensate for any resiliency loss of the wall structure which forms the female detent member $11a$ which may be accompanied by the presence of the bottom wall $11b_4$ according to the embodiment of FIGS. 3A–3D. That is, the male detent member $11b$, and particularly the enlarged head $11b_1$ thereof will, according to the embodiment shown in FIGS. 3A–3D be compressed radially inwardly due to the presence of the axial recess $11b_4$. Upon entry into the defined space $11a_1$, the enlarged head $11b_1$ will resiliently expand to its normal dimension due to the inherent resiliency of the plastics material from which it is molded. Such a state is specifically shown in accompanying FIG. 3D.

Another embodiment of the present invention is shown in accompanying FIGS. 4A–4D. As is shown each of the female and male detent members $40a$ and $40b$ is formed of a number of discrete, essentially planar, wall members $40a_1$ and $40b_1$ which protrude outwardly from the surfaces $12a'$, $12b'$ of the cassette case halves $12a$, $12b$, respectively. In this regard, the discrete wall members $40a_1$, $40b_1$ are each disposed on their respective surfaces $12a'$, $12b'$ so as to circumscribe a generally rectangular interengagement region (i.e., a region that is generally rectangular in plan view in which the female and male detent members $40a$ and $40b$, respectively, interengage one another). The wall members $40a_1$, $40b_1$ could, however be convexly arcuate, if desired, so as to circumscribe generally circular or elliptical interengagement regions.

In any event, as with the embodiments described previously, the interengagement region of the wall members $40a_1$, $40_2$ have a width dimension $D_1'$ which is at least about two times (and preferably at least about three times) the depth dimension $D_2'$.

As can perhaps best be seen in FIGS. 4A–4B, the discrete wall members $40a_1$ of the female detent $40a$ project upwardly from the surface $12a'$ of the cassette case half $12a$ and are oriented in a direction whereby the wall members $40a_1$ diverge outwardly away from one another. The wall members $40b_1$ associated with the male detent $40b$, on the other hand, project outwardly from the surface $12b'$ of the cassette case half $12b$, but are oriented in a converging relationship to one another. In addition, the converging angular orientation of the wall members $40b_1$ conforms to the diverging angular orientation of the wall members $40a_1$.

In use, the male and female detents $40b$, $40a$ will be forcibly engaged with one another so as to be in tight interference fit as shown in FIG. 4B. Most preferably, the opposing inner and outer edges $40b_2$, $40a_2$ of the wall members $40b_1$, $40a_1$, respectively, will be bevelled so as to assist in the relative spreading displacement of the wall members $40a_1$ and $40b_1$ when the male and female detents $40b$ and $40a$ are forcibly pressed together. This slight spreading displacement thereby serves to enhance the interference fit as between the wall members $40a_1$ and $40b_1$ due to the natural resiliency of the plastics material from which they are formed tending to return the wall members 40$a_1$ and 40$b_1$ to their normal position.

The most preferred thermoplastics material from which the cassette case halves 12$a$, 12$b$ (and hence the female and male detents unitarily formed therewith) may be molded is a polyacetal resin which exhibits the desired resiliency and other mechanical properties suitable for use as microdisc cassette cases. In this regard, the preferred plastics material is an oxymethylene polymer having repeating oxymethylene (—CH$_2$O—) units. The oxymethylene polymers that may be satisfactorily employed according to the present invention can be either homopolymers (i.e., comprised solely of recurring oxymethylene units, exclusive of endcapping units), or copolymers (i.e., comprised mainly of recurring oxymethylene units randomly interspersed with higher oxyalkylene (preferably oxyethylene) units, exclusive of endcapping units). The preferred oxymethylene homopolymers may be made using the techniques disclosed in U.S. Pat. No. 2,768,994 to MacDonald, whereas the preferred oxymethylene copolymers may be made using the techniques disclosed in U.S. Pat. No. 3,027,352 to Walling (the entire content of each being expressly incorporated hereinto by reference).

Oxymethylene copolymers comprised mainly of recurring oxymethylene units interspersed with oxyethylene units are especially preferred. The most preferred oxymethylene copolymers are Celcon ® oxymethylene copolymers commercially available from Hoechst Celanese Corporation, Engineering Plastics Division, Short Hills, N.J. Most preferred is Celcon ® Grade MM3.5C polyoxymethylene copolymer.

If desired, the oxymethylene polymers may include additives typically employed in engineering resin compositions. Some of the additives that may be incorporated into oxymethylene polymers include antioxidants, UV stabilizers, free radical scavengers, lubricants, fillers, reinforcing media (e.g., glass fibers), colorants, and the like.

The preferred oxymethylene copolymer will possess a tensile strength (ASTM D638) at break of between 7600–8300 psi; an elongation (ASTM D638) at break of between 40–75%; a tensile yield strength (ASTM D638) of between 8800–10400 psi; a compressive strength (ASTM D695) of about 16000 psi @10%; a flexural strength (ASTM D790) of about 13000 psi; and a tensile modulus (ASTM D638) of between 410–464 $\times 10^3$ psi.

The present invention has been described in connection with what is presently considered to be the most practical and preferred embodiments. However, it is to be understood that the invention is not to be limited to the disclosed embodiments, but on the contrary, is intended to cover various modifications and equivalent structural/functional arrangements included within the spirit and scope of the appended claims.

What is claimed is:

1. A relatively thin microdisc cassette case having a generally rectangular parallelpiped shape adapted to house therewithin a standardized 3.5-inch flexible magnetic disc, said cassette case comprising;

a pair of opposing planar cassette case halves having a pair of interior surfaces, and detent members for joining said cassette case halves one to another in face-to-face relationship, wherein said detent members include a number of registered male and female detent members, said registered male and female detent members being in an interfere friction fit with one another to securely joint the cassette case halves one to another yet allow the cassette case halves to be separable upon application of a separatory force of sufficient magnitude; and wherein width dimension measured detent members establish a continuous peripheral interengagement region having a width dimension measured parallel to the plane of said cassette case halves, and a depth dimension measured perpendicular to the plane of said cassette case halves between said pair of interior surfaces, said width dimension being at least twice said depth dimension.

2. A cassette case for flexible magnetic discs comprising:

a pair of planar cassette case halves having a pair of interior surfaces and formed of a synthetic resin material; and a number of frictionally interlocked pairs of male and female detent members which join said pair of cassette case halves one to another in face-to-face relationship;

each of said male detent members begin formed as a one-piece structure with one of said cassette case halves, and each of said female detent members being formed as a one-piece structure with the other of said cassette case halves; wherein said pairs of male and female detent members each have a continuous peripheral edge which defines a generally annular interengagement region having a width dimension measured parallel to the plane of said cassette case halves, and a depth dimension measured perpendicular to the plane of said cassette case halves between said interior surfaces, wherein said width dimension is at least twice said depth dimension, and wherein said pairs of said male and female detents are frictionally interlocked with one another along said continuous peripheral edges thereof.

3. A cassette case as in claim 1 or 2, wherein said male detent members are each projecting nibs having an enlarged head portion which defines an exterior peripheral edge, and wherein said female detent members are each formed of an annular upright wall defining a space sized and configured to accommodate said enlarged head of said male detent member and having a narrow entranceway, wherein said narrow entranceway defines an interior peripheral edge which mateable locks with said exterior peripheral edge of said male detent member.

4. A cassette case as in claim 3, wherein said male detent member is solid.

5. A cassette case as in claim 3, wherein said male detent member includes a central recess.

6. A cassette case as in claim 3, wherein said defined space is part of an aperture which extends through said cassette case half.

7. A cassette case as in claim 2, wherein said peripheral edges of each of said male and female detent pairs are each conformingly bevelled.

8. A cassette case as in claim 1 or 2, which is molded from an oxymethylene polymer.

9. A cassette case as in claim 8, wherein said oxymethylene polymer is an oxymethylene copolymer comprised mainly of repeating oxymethylene units randomly interspersed with higher oxyalkylene units.

10. A cassette case as in claim 9, wherein said higher oxyalkylene units are oxyethylene units.

11. A relatively thin microdisc cassette case having a generally rectangular parallelpiped shape adapted to house therewith a standardized 3.5-inch flexible magnetic disc, said cassette case comprising:
   a pair of opposing planar cassette case halves; and
   a number of registered male and female detent members for joining said cassette case halves one to another in face-to-face relationship;
   said registered male and female detent members being in an interference friction fit with one another to securely join the cassette case halves one to another yet allow the cassette case halves to be separable upon application of a separatory face of sufficient magnitude; wherein
   said male detent members are provided by a number of discrete male wall members which convergingly outwardly project from said one of said cassette case halves, and said female detent members are provided by a number of discrete walls which project divergingly outwardly form another one of is a cassette case halves; and wherein
   said male and female wall members define an annular interengagement region such that said male wall members are laterally frictionally engaged with a respective female wall member within said annular interengagement region defined thereby.

12. A cassette case for flexible magnetic discs comprising:
   a pair of planar cassette case halves formed of a synthetic resin material; and
   a number of frictionally interlocked pairs of male and female dent members which join said pair of cassette case halves one to another in face-to-face relationship;
   each said male detent member being provided by a number of discrete male wall members each of which is formed as a one-piece structure with one of said cassette case halves, and each said female detent member being provided by a number of discrete female wall members each of which is formed as one-piece structure with the other of said cassette case halves; wherein
   said male wall members convergingly outwardly project from said one of said cassette case halves, and said female wall members divergingly outwardly project from said another one of said cassette case halves in diverging relationship to one another; and wherein
   said male and female wall members of said pairs of male and female detent members have edges which define a generally annular interengagement region having a width dimension measured parallel to the plane of said cassette case halves which is at least twice its depth dimension as measured perpendicular to the plane of said cassette case halves, wherein said male wall members are laterally functionally interlocked with respective female wall members along said annular interengagement region.

13. A cassette case as in claim 11 or 12, wherein said male and female wall members are planar.

14. A cassette case as in claim 11 or 12, wherein said male and female wall members respectively terminate in cooperating engageable opposing bevelled edge surfaces.

15. A cassette case as in claim 14, wherein said bevelled edge surfaces of said male wall members are disposed along an interior edge region thereof.

16. A cassette case as in claim 15, wherein said bevelled edge surface of said female wall members are disposed along an exterior edge region thereof.

17. A cassette case as in claim 11 or 12, which is molded from an oxymethylene polymer.

18. A cassette case as in claim 17, wherein said oxymethylene polymer is an oxymethylene copolymer comprised mainly of repeating oxymethylene units randomly interspersed with higher oxyalkylene units.

19. A cassette case as in claim 18, wherein said higher oxyalkylene units are oxyethylene units.

* * * * *

UNITED STATES PATENT AND TRADEMARK OFFICE
CERTIFICATE OF CORRECTION

PATENT NO. : 5,212,614

DATED : May 18, 1993

INVENTOR(S) : HUGHES et al

It is certified that error appears in the above-identified patent and that said Letters Patent is hereby corrected as shown below:

Column 1, line 18, after "of" insert --a--.

Column 6, line 2, after "embodiments" delete "have" and insert --has--;
line 17, after "3D" insert a comma (,);
line 43, change "have" to --has--.

Column 7, line 68, after "securely" delete "joint" and insert --join--.

Column 8, line 4, after "wherein" delete "width dimension measured" and insert --said male and female--.

Column 10, Claim 12, line 16, after "laterally" delete "functionally" and insert --frictionally--.

Signed and Sealed this

Eighteenth Day of January, 1994

*Attest:*

BRUCE LEHMAN

*Attesting Officer*     *Commissioner of Patents and Trademarks*